March 24, 1959  R. L. CARLSTEDT  2,878,693
BORING MACHINES
Filed Feb. 16, 1954  6 Sheets-Sheet 1

March 24, 1959

R. L. CARLSTEDT 2,878,693

BORING MACHINES

Filed Feb. 16, 1954

Inventor:
Ragnar Leonard Carlstedt
By James L. Marble
His Attorney

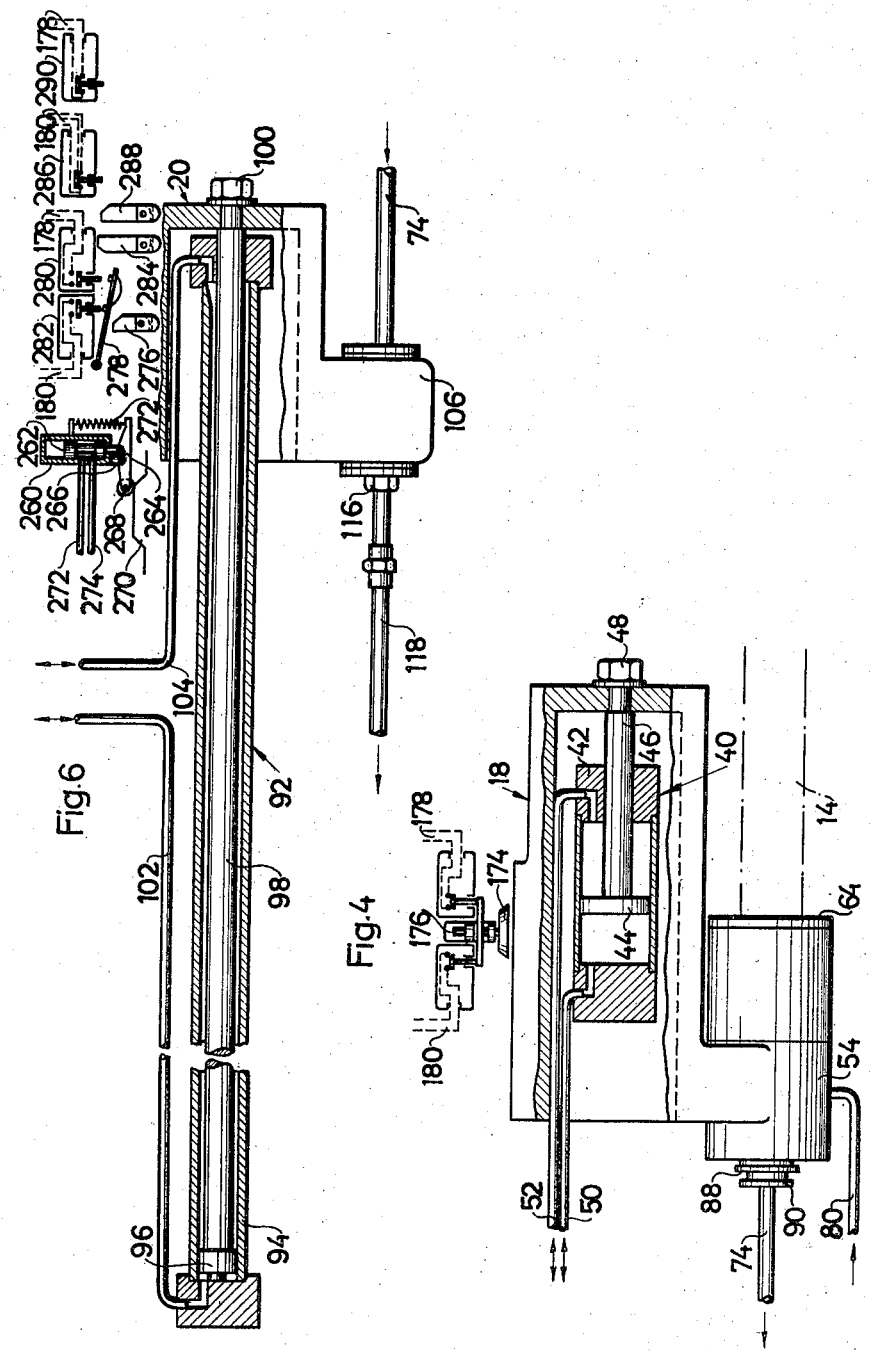

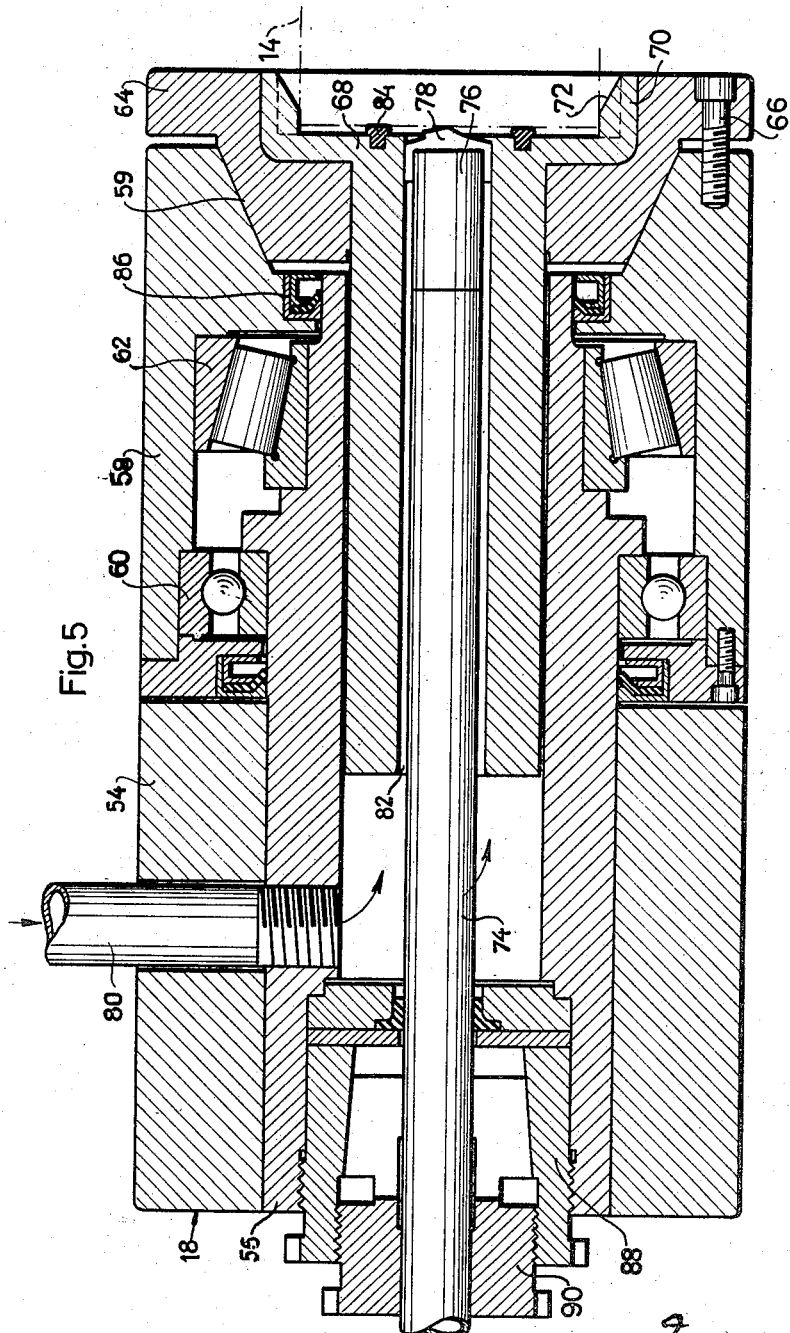

March 24, 1959
R. L. CARLSTEDT
2,878,693
BORING MACHINES
Filed Feb. 16, 1954
6 Sheets-Sheet 5
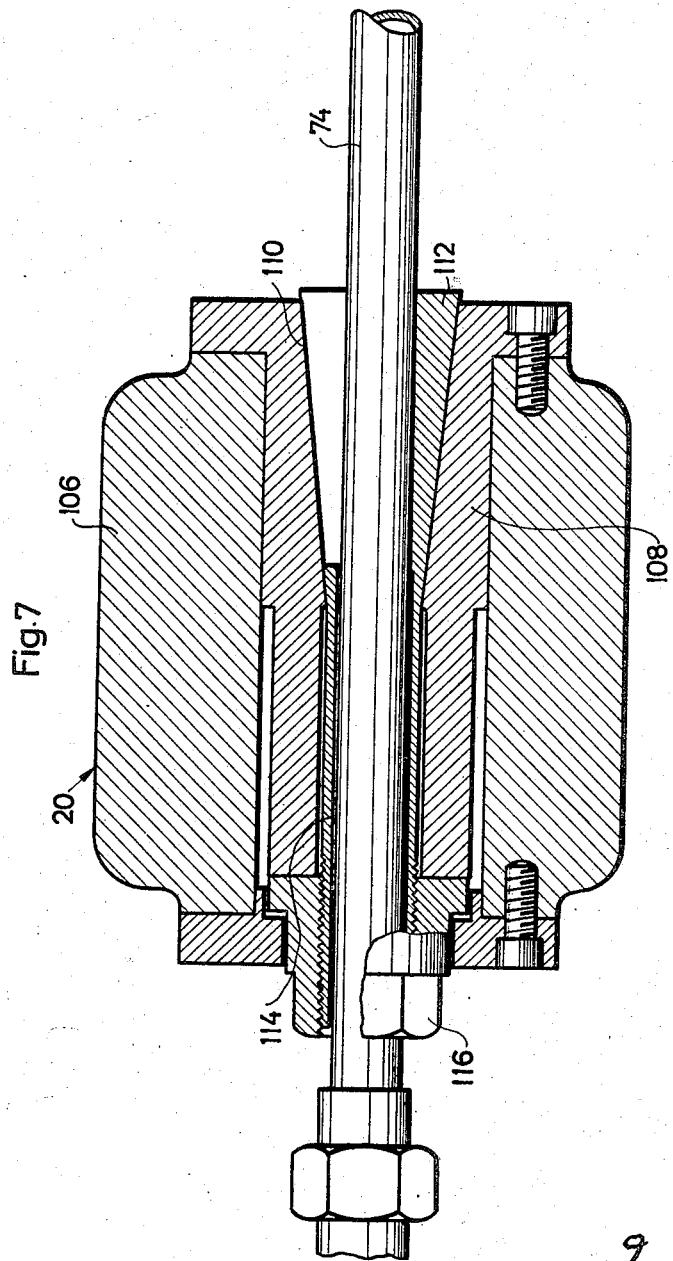

March 24, 1959  R. L. CARLSTEDT  2,878,693
BORING MACHINES

Filed Feb. 16, 1954  6 Sheets-Sheet 6

United States Patent Office 2,878,693
Patented Mar. 24, 1959

2,878,693

BORING MACHINES

Ragnar Leonard Carlstedt, Hagersten, Sweden, assignor to DHB Corp., New York, N.Y., a corporation of New York Application February 16, 1954, Serial No. 410,548

Claims priority, application Sweden February 20, 1953

3 Claims. (Cl. 77—3)

This invention relates to boring machines provided with a motor-driven spindle mounted in a frame, clamping means for the workpiece and with members for feeding either the workpiece or a boring tool during the boring operation. The invention more particularly relates to boring machines having a feed slide advanced during the boring operation along a bed in the frame and a clamping slide for the workpiece displaceable along the bed and wherein the feed and clamping slides are preferably actuated by servo-motors.

One object of the invention is to provide a boring machine of the above kind which permits a very high feeding speed of the tool. By way of example the speed may be of the order of 250 millimeters per minute and over when boring holes 35 millimeters diameter in iron objects.

Another object of the invention is to provide a boring machine automatically controlled as to operation when the working tool becomes blunted or the supply of cooling liquid becomes unsatisfactory, the working operation then ceasing and the tool returned into its inoperative position.

A further object of the invention is to provide a boring machine wherein the workpiece is located laterally of the longitudinal central plane of the machine so as to provide for convenient insertion of the work into and removal thereof from the machine.

The invention will be hereinafter more fully described with reference to the construction of a long-hole boring machine illustrated in the accompanying drawings, in which:

Fig. 4 is a vertical longitudinal section on the line IV—IV of Fig. 2, through a portion of a clamping slide of the machine.

Fig. 5 is a vertical section on the line V—V of Fig. 2 through another portion of the clamping slide.

Fig. 6 is a vertical longitudinal section on the line VI—VI of Fig. 2 through a feeding or borer slide of the machine and with a hydraulic servo-motor pertaining thereto.

Fig. 7 is a vertical section on the line VII—VII of Fig. 2 through another part of said feeding or borer slide.

Figure 1:
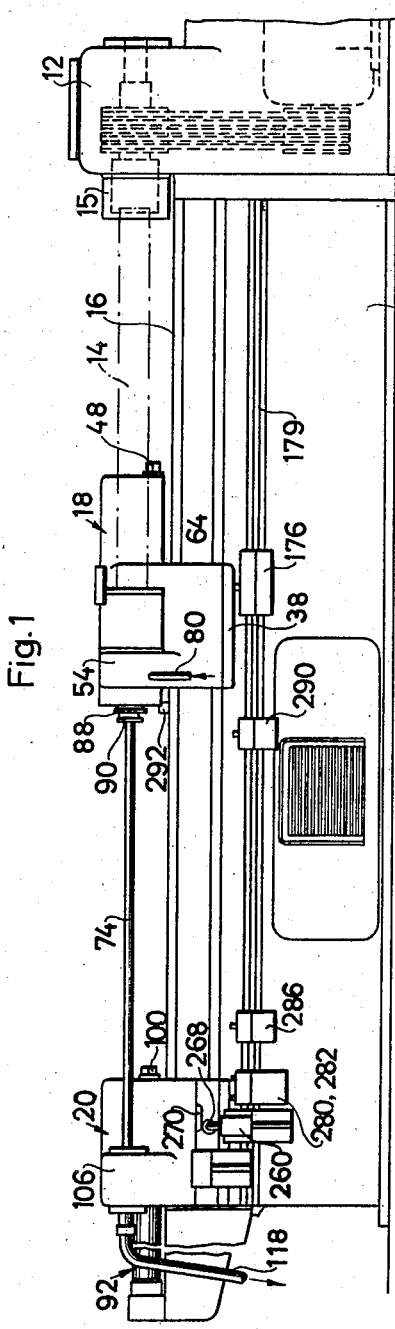
Fig. 1 shows the machine in elevation.
Figure 2:
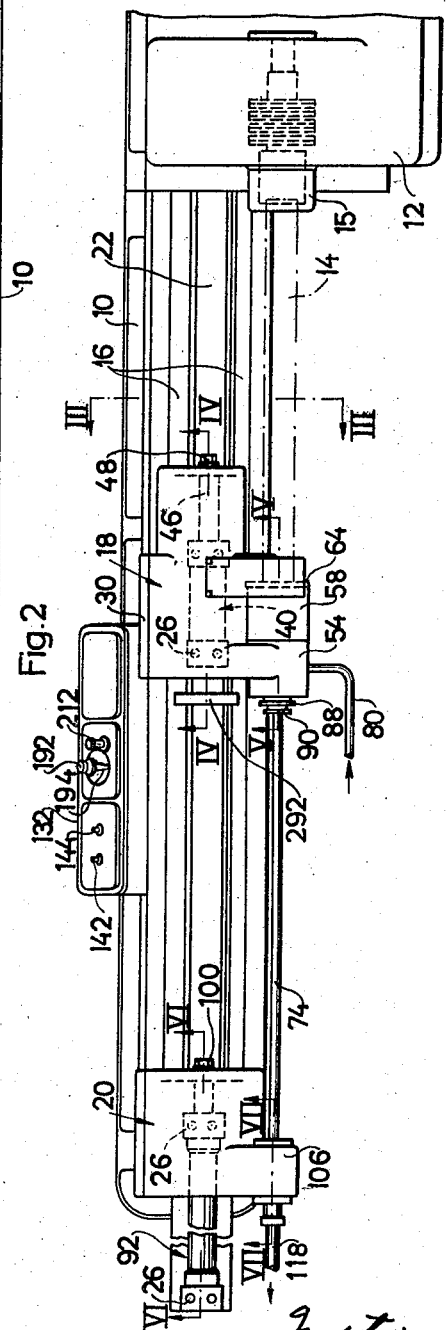
Fig. 2 shows the same machine in plan, a portion of a servo-motor forming part of the machine on the left-hand side thereof being cut away in both figures.

The machine shown in the drawings has an elongated frame 10 provided at one end thereof with a compartment 12 housing, inter alia, the driving motor 13, hereinafter termed the main motor, for rotating the workpiece 14 indicated by chain-dotted lines. The workpiece is held and entrained by means of a spindle 15 driven by the motor. The spindle 15 is so devised that the workpiece, which in the present case comprises a cylindrical iron bar, is brought into driving connection with the spindle solely by the application of pressure on the opposite end of the workpiece. The frame 10 has a longitudinally extending bed 16 at the upper surface thereof, along which bed a clamping slide, generally designated by 18, and a feeding or borer slide, generally denoted by 20, are slidably displaceable.

The frame 10 is formed with a longitudinally extending guide surface 28 (Fig. 3), against which bears a plate 30 carried by each of the slides 18 and 20. Provided on the other side of the frame are similar vertical guide surfaces 32 and a lower guide surface 34, a member 36 projecting from the slide body and a plate 38 bearing against said guide surfaces 32 and against said guide surface 34, respectively.

Figure 3:
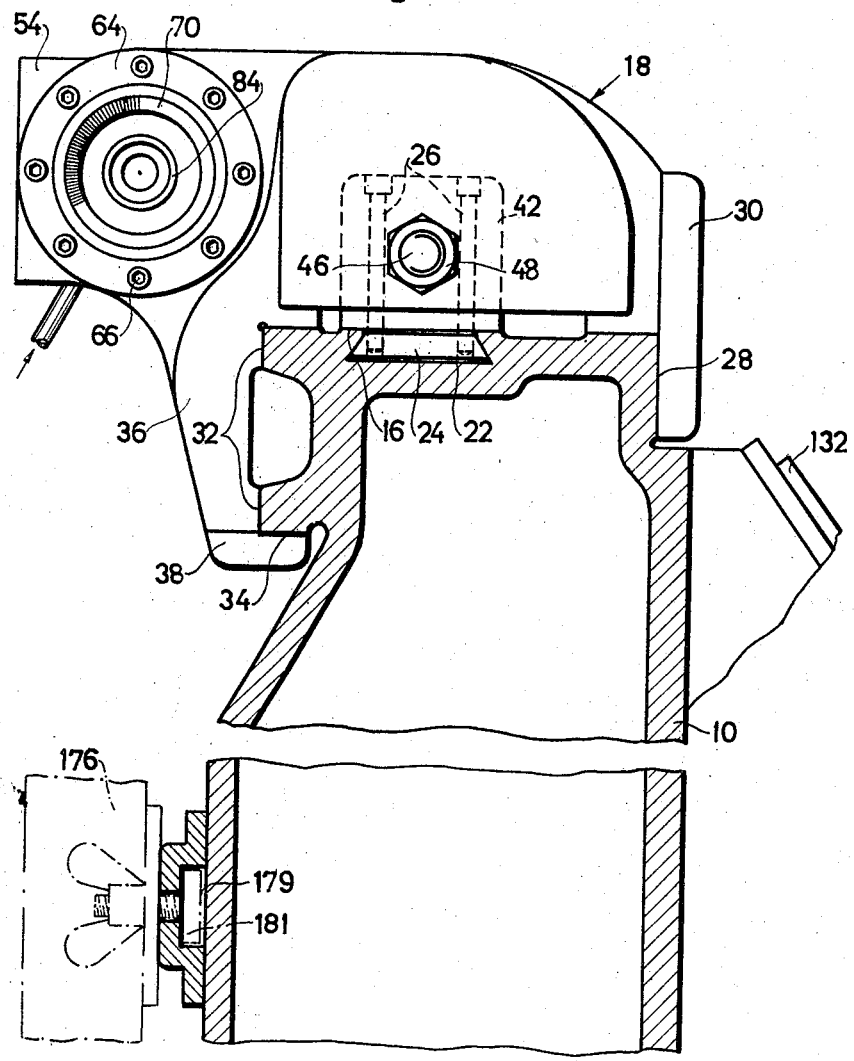
Fig. 3 shows members of the machine, partly in vertical section on the line III—III of Fig. 2.

The position of the clamping slide 18 relatively to the frame is dependent one the length of the workpiece 14. In the adjusted position, the slide is movable by means of a servo-motor generally designated by 40, which is actuated by a gaseous pressure fluid, preferably air. The servo-motor comprises a cylinder 42 closed at both ends thereof, Fig. 4, and adapted to be locked in any desired position on the bed 16 by means of a dove-tail groove 22 formed in the bed and receiving a plate 24 of corresponding shape, as shown in Fig. 3. Threaded in the cylinder 42 are bolts 26, by means of which the plate 24 may be clamped fast in the groove 22, so as to lock the cylinder relatively to the frame 10.

The cylinder 42 contains a displaceable piston 44 rigidly connected to the slide body by means of a piston rod 46 and a bolt 48. Compressed air from a source of pressure, which may comprise the compressed air system normally available in a workshop is supplied to one or the other side of the piston 44 through conduits 50 and 52, respectively. These conduits may be brought into communication with the source of compressed air or with atmosphere by means of an operating device shown diagrammatically in Fig. 8, hereinafter more fully described.

The spindle 15 is located laterally of the frame 10 or the bed 16 thereof. The clamping slide 18 has a projection 54 extending laterally outside the guide surfaces of the frame guiding the slide. It may thus be stated that the spindle 15 and the projection 54 are offset laterally from the longitudinal vertical central plane of the frame. The slide projection 54 carries a stationary sleeve-shaped member 56 (Fig. 5), on which a bearing sleeve 58 is rotatably mounted by means of bearings 60, 62 adapted to take up radial and axial pressures. The bearing sleeve 58 has a conical surface 59, against which a ring 64 is held with a tight fit by means of bolts 66. The ring 64 carries, in turn, a sleeve 68 having one end widened into a holder flange 70 cut away as at 72 on its inner face to provide for the centering of the workpiece 14.

Passing centrally through the slide portion 54 is a boring pipe 74 carrying at its outer end a boring cone 76 provided with a cutting tool 78. In Fig. 5, the cutting tool is in the position when the boring operation is just about to be commenced. Cooling liquid, such as oil, is supplied to the slide member 54 through a conduit 80 from a source of pressure (not shown). The cooling liquid then passes through a clearance 82 formed between the members 68 and 74, and escapes in known manner through the interior of the boring pipe 74 together with the chips removed in the boring operation. The pressure of the cooling liquid is very high, such as for example 25 atm. It is particularly important, therefore, to prevent leakage, and to this end an annular packing 84 is arranged between the end surface of the workpiece 14 and the member 68, said packing being mounted in the member 68. The cooling liquid is prevented from penetrating into the bearing 60, 62 by a packing 86. The boring pipe 74 is surrounded at the other end of the slide member 54 by a stuffing box 88 intended to counteract outward leakage of the cooling liquid along the pipe. Comprised in the packing is a gland 90 acting to damp vibrations.

Feeding movement of the feed or borer slide 20 is effected by means of an hydraulic pressure medium acting on a servo-motor, designated generally by 92. The servo-motor comprises an elongated cylinder 94 (Fig. 6) closed at both ends and adapted to be locked in the desired position by means of plates 24 located in the dovetail groove 22 in the bed of the frame. Within the cylinder 94 is a piston 96 secured through a piston rod 98 to the body of the slide 20 by means of a nut 100. The space on each side of the piston 96 may be connected through conduits 102 and 104, respectively, with a source of pressure liquid, such as oil, or with an outlet, as will be described more fully hereinafter. When pressure liquid is supplied to the servo-motor through the conduit 102, the slide 20 moves to the right according to Fig. 6, the slide then moving the cutting tool 78 in a direction toward the spindle 15, thus effecting a boring operation.

The boring pipe 74, which is coaxial with the spindle 15, is clamped in the borer slide 20 by means of the device shown in Fig. 7. The slide 20, like the slide 18, is formed with a portion 106 projecting laterally outside the bed 16 of the frame and having a bore extending therethrough to receive a sleeve 108 having a conical surface 110 for a portion of its length. Co-operating with the conical surface is a slotted clamping sleeve 112 provided with a cylindrical extension 114, on the end of which is screwed a nut 116. On tightening the nut 116 the clamping sleeve 112 is pressed tightly against the surface 110, the boring pipe 74 then being fixed relatively to the slide 20 in an axial direction. Arranged on the rear end of the boring pipe 74 is a hose 118, through which the cooling liquid and the boring chips escape to a sump.

The piston rod 46 in the clamping slide 18 and the piston rod 98 in the borer slide 20 are connected to the respective slides at the end walls thereof facing the workpiece, as will be seen particularly from Figs. 4 and 6. As a result the two slides, when moved in a direction toward the spindle 15 for producing a working operation, will be displaced by a force applied at a point located laterally of the slide portions 54 and 106, respectively, so that in consequence the oblique turning moments caused by the eccentric positions of the workpiece and the boring rod relatively to the central plane of the frame become very moderate.

On the other hand, the location of the holder members for the workpiece is of substantial importance in permitting the same to be conveniently and rapidly mounted into and removed from the machine, especially when the weight of the workpiece is so great as to call for special lifting means. A finished workpiece may thus be moved by a conveying member, the gripping jaws or the like of the same moving straight upwardly or downwardly beneath the point of attachment of the workpiece.

Figure 8:
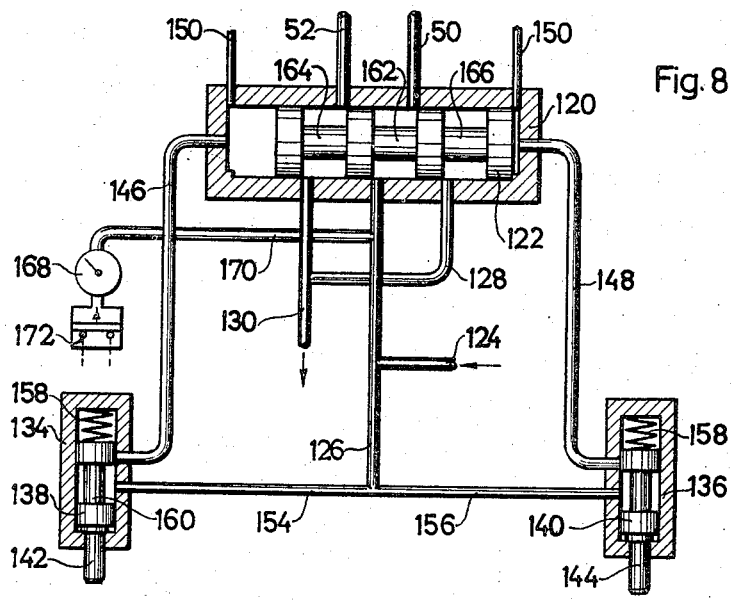
Fig. 8 is a diagrammatic representation of a device for the operation of the clamping slide.

As shown in Fig. 8, the two conduits 50, 52 communicate with a piston housing 120 containing a displaceable piston 122. A conduit 124 communicating with a source of compressed air is likewise connected to the piston housing 120 through a conduit 126. Extending from the piston housing are two conduits 128 and 130, which are preferably joined and open into the atmosphere. Two valve housings 134, 136 are built into a switchboard 132. Arranged in the valve housings is a valve member 138 and 140, respectively, which projects by a continuation 142 and 144, respectively, outside the valve housing to form, each of them, a push-button accessible on the switchboard.

The valve housing 134 is connected through a conduit 146 to the left-hand end of the piston housing 120, and the valve housing 136 is connected through a conduit 148 to the right-hand end thereof, as viewed in Fig. 8. Extending from the respective ends of the piston housing 120 are outlet conduits 150, 152 of a preferably smaller cross-section than that of the conduits 146, 148 connected to the valve housing 134 and 136. The latter are also provided with conduits 154 and 156 connecting the compressed air conduit 124 with the valve housings. Resilient members 158 tend to keep the push-buttons 142, 144 in the outer position.

In this position of the valve members 138, 140, the conduits 146 and 148 respectively are cut off from the interior of the valve housings. If the push-button 142 is now moved inwardly with compression of the spring 158, the conduits 154, 146 are caused to communicate with each other due to a recess 160 formed in the piston 138. This results in the piston 122 being displaced to the right, into the position it assumes in Fig. 8. As soon as the push-button 142 is released it returns to its initial position.

A recess 162 in the middle portion of the piston 122 has now brought the compressed air conduit 124 into communication with the conduit 50, and the servo-motor piston 44 moves the slide 18 in a direction towards the workpiece 14. On the other hand, the piston 122 has brought the conduit 52 into communication with the outlet 130 through a recess 164 so that the other side of the piston 44 is entirely relieved of pressure. On pressing the buton 144 inwardly, the piston 122 is moved over to the left, the recess 162 then connecting the pressure conduit 124 with the conduit 52, while the conduit 50 becomes relieved of pressure through a recess 166 and the outlet conduit 128. The slide 18 then moves in a direction away from the workpiece 14.

Should the pressure in the conduit 124 sink below a certain value for some reason or another, it actuates a pressure gauge 168 communicating with the conduit 124 through a conduit 170, to open a contact 172 thus interrupting the current supply to the main motor and to the cooling liquid motor, the workpiece thus being brought to a standstill.

Secured to one side of the clamping slide 18 is an abutment 174 (Fig. 4) having obliquely cut edges. A contactor 176, adapted to actuate the circuit 178 of the main motor and the circuit 180 of the cooling liquid motor, is adjusted relatively to the frame, so as to be located opposite the abutment when the centering flange 70 of the clamping slide has been brought into contact with the workpiece. If the slide 18 should be started before a workpiece 14 has been brought into position between its setting members, the abutment 174 moves past the contactor 176 in a direction to the right viewed in Fig. 4, so that the main motor and the cooling liquid motor cannot start.

The contactor 176 is displaceable along a groove 179 (Figs. 1 and 3) formed in the frame 10 and of T-shaped cross-section, the groove receiving a profile bar 181 or the like of the same configuration. In Fig. 4, the parts 174, 176 have been shown on the opposite side of the slide 18 as compared with Fig. 1.

Figure 9:
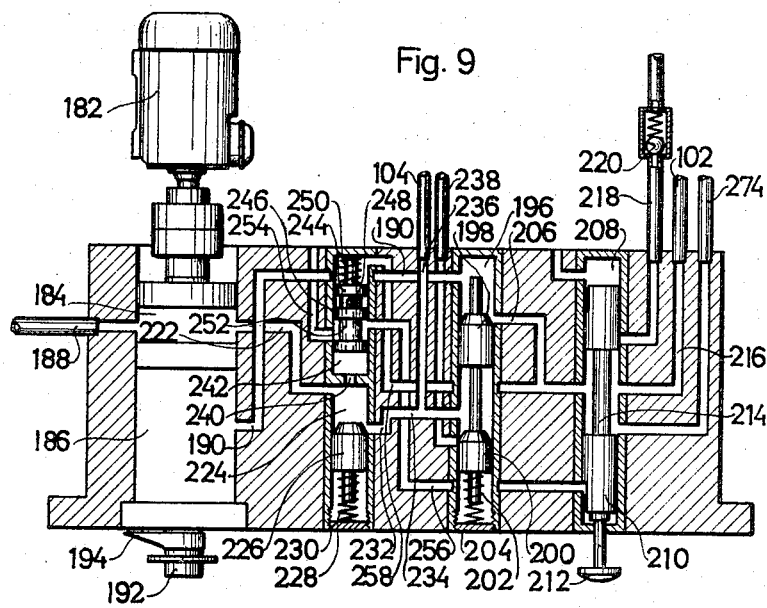
Fig. 9 is a diagrammatic sectional representation of a device for the operation of the feeding or borer slide.

In Fig. 9, 182 denotes an electric motor driving a gear wheel pump 184 and a piston pump 186. Oil is lead to the pump 184 from a sump through a conduit 188. The pressure oil flows from the gear wheel pump to the piston pump, from which the oil quantity escaping through a conduit 190 is adjustable in known manner by means of a knob 192 on the switchboard 132, said knob carrying a pointer 194 moving over a scale directly indicating the feeding speed of the borer slide, which speed depends on the quantity of oil fed through the conduit 190 per unit of time.

The conduit 190 opens into a cylinder chamber 196 containing a freely movable piston 198 and a piston 200 actuated by a spring 202 bearing on an abutment 204, which is adjustable from the outside to different depths in the chamber 196. In the position shown, the piston 198 uncovers a conduit 206 communicating with the central portion of a chamber 208. Arranged in the chamber is a piston 210 manually displaceable from the outside by means of a knob 212. The piston 210 is provided at its centre with a recess 214, so that the pressure oil may continue through the chamber to a conduit 216 connected to the conduit 102 leading to the servo-motor 92.

Oil will thus flow through the above-mentioned system of conduits from the piston pump 186 to the left-hand side of the servo-motor piston 96 as viewed in Fig. 6, the borer slide 20 being thus displaced towards the spindle 15 at a speed determined by the adjustment of the knob 192. As seen in Fig. 9, the knob 212 is in its withdrawn position, wherein the piston 210 cuts off communication between the middle portion of the chamber 208 and a conduit 218 leading to the above-mentioned sump through a non-return valve 220.

Extending from the gear wheel pump 184 is a conduit 222, which opens into a chamber 224, containing a piston 226. This piston is acted on by a spring 228 bearing against an abutment 230, which is adjustable from the outside. At a pressure determined by the spring 228 the pressure oil passing through the conduit 222 is capable of uncovering a conduit 232 to a varying extent. This pressure determined by adjustment of the abutment 230, may amount to 25–30 atm. The conduit 232 communicates through a conduit 234 with the space of the chamber 196 between the pistons 198 and 200 and also through a conduit 236 with the conduit 104 leading to the other side of the piston 96.

The pressure in the conduit 104 is determined by the piston 200, since the latter, depending on the preadjusted pressure of the spring 202, more or less opens communication with a conduit 238 leading to the sump. The piston 198, which is actuated by the supply pressure of the oil from the piston pump 186, depresses the piston 200 when said pressure reaches the value concerned so that the latter piston is caused to open fully the outlet through the conduit to the sump. The pressure in the conduit 104, which may be termed the back pressure, then sinks to a low value or to zero.

The back pressure is normally lower or considerably lower than the supply pressure. However, if during the feeding of the slide 20 the boring bit should meet a hollow "piping" in the workpiece so as to reduce the resistance to boring and thus to cause the supply pressure to drop suddenly the piston 198 will move in a direction away from the piston 200. The latter piston then closes the conduit 238 to a greater or smaller extent, whereupon the back pressure is augmented in the conduit 104. The feeding of the slide thus proceeds uniformly without jerks until the hollow part has been passed, when the back pressure is automatically reduced again.

The chamber 224 communicates through an aperture 240 with a chamber 242 containing a displaceable reversing valve 244. This valve has a constriction 246, subjected through an internal channel 248 continuously to the pressure prevailing in the chamber 224. The reversing valve 244 is under the infleunce of a spring 250 tending to move the valve in a downward direction as viewed in Fig. 9. The reversing valve has a second constriction 252, opposite which extends a conduit 254 communicating with the atmosphere and a further conduit 256 extending to the outside of the piston 210.

The part of the chamber 242 located above the reversing valve 244 is in constant communication with the conduit 206 through a conduit 258. If the pressure of the boring tool against the workpiece should rise for some reason or another, for instance by the tool becoming blunt, the pressure of the liquid delivered by the piston pump 186 being thus also caused to rise, the latter pressure will act through the conduit 258 to move the reversing valve 244 downwardly, so that communication between the conduits 254 and 256 is interrupted, the channel 248 then being brought into communication with the conduit 256. This results in the outside of the piston 210 being subjected to pressure, so that said piston is displaced inwardly and the conduit 102 is relieved of pressure through the conduit 216 and the uncovered outlet conduit 218.

The machine thus responds automatically so as to cause cessation of the boring pressure when the tool is no longer serviceable. When this takes place, the piston 200 is also relieved of the supply pressure acting on the piston 198, and consequently moves upwardly, so that the sump outlet 238 is closed. A back pressure is then built up in the conduit 104, which pressure rapidly moves the bore slide back into its initial position.

It will be assumed that the clamping slide 18 has clamped a workpiece 14 in the machine. Further, the button 212 has been pulled out, so that the servo-motor piston 96 in the power slide receives pressure oil through the conduit 102. The boring tool is still at a distance from the workpiece and a valve 260 then assists in rapid movement of the boring tool by the borer slide 20 into the immediate proximity of the workpiece. The valve 260 has a piston 262 (Fig. 6) which is pivotally mounted on an arm 264 mounted at 266. One end of the arm carries a roller 268 illustrated in Fig. 6 as lifted by a cam 270. The piston 262 has been pulled downwardly against the action of a spring 272 so as to open a connection between two conduits 272 and 274, the latter leading to the central portion of the chamber 208 and the conduit 272 communicating with the conduit 104.

The conduit 102 will now be fed with oil from both of the pumps 184, 186. It is true that both sides of the piston 96 are under the same (comparatively low) pressure, but since the pressure by the presence of the piston rod 98 acts on an area so much smaller on the right-hand side than on the left-hand side of the piston, as viewed in Fig. 6, the slide 20 moves in a direction toward the workpiece. A relatively large quantity of oil is thus available, the major portion of which flows into the left-hand chamber of the servo-motor cylinder, the slide movement thus becoming correspondingly rapid.

Arranged on the borer slide 20 is a pawl 276 adapted to raise a contact arm 278, when the borer approaches the workpiece, and thus to close, preferably, first the circuit 180 for the cooling liquid motor and then the circuit 178 of the main motor. The contacts 280 and 282 co-operating with the arm 278 are so devised that the circuits remain closed even after the arm has left the same. The pawl 276 is pivoted so as to swing back on the return movement of the borer slide, when it again abuts the contact arm 278.

The borer 74 now commences its feeding movement into the workpiece while performing its boring operation. After a small feeding travel, a pawl 284 meets a contactor 286, which is connected into the circuit 180 of the cooling liquid motor, but since the pawl is pivoted for movement in a counter-clockwise direction as viewed in Fig. 6 it has no action. When during continued movement of the slide 20 the borer 74 has finished boring the hole in the workpiece, a pawl 288 on the slide impacts a contactor 290 which breaks the circuit of the main motor 13, which is thus brought to a standstill with braking.

After a further small feeding movement of the slide 20 it abuts against an adjustable stop 292 on the frame 10. The pressure then rises momentarily in the conduit 102, so that the feeding pressure is relieved in the manner above described. A back pressure is created or raised in the conduit 104, which back pressure moves the slide 20 rapidly back toward its initial position. Immediately before the borer leaves the workpiece, the pawl 284 impacts the contactor 286, so that the cooling liquid motor is brought to a standstill.

What I claim is:

1. In a boring machine of the nature described; a frame, a motor-driven spindle in the frame, a clamping slide in the frame for clamping a workpiece against the spindle, a boring tool extending through the clamping slide so as to bear against the end of the clamped workpiece, a boring slide slidable in the frame supporting the boring tool, a fluid motor connected between the frame and the boring slide for reciprocating the said slide in the frame, a first pump connected to the advancing side of the motor for supplying feed pressure to the said fluid motor for advancing said slide, a second pump connected to the retraction side of the motor for maintaining a back pressure on said motor to resist the movement thereof, a bypass to exhaust from said second pump including a variable restrictor, fluid pressure responsive means associated with said restrictor and connected to said advancing means for varying the degree of restriction of the restrictor inversely to the pressure on said advancing side of the motor, and means responsive to a predetermined increase in resistance to movement of said slide for connecting said advancing side to exhaust and for interrupting said bypass.

2. In a boring machine; a frame, a motor driven spindle in the frame, a clamping slide on the frame for clamping the workpiece against the spindle for rotation thereby, a boring tool extending through the clamping slide so as to bear against the end of the workpiece, a boring slide slidable on the frame supporting the boring bar, a fluid motor connected between the frame and the boring slide for reciprocating the slide on the frame and having advancing and retracting sides, a first positive displacement pump connected to the advancing side of the motor for supplying feed pressure to the motor to advance the slide and whereby changes in resistance to movement of the slide will produce corresponding changes in pressure on the advancing side of said motor, a second pump connected to the retraction side of the motor for maintaining a back pressure thereon, a bypass to exhaust from said second pump, a variable restrictor in said bypass, fluid pressure responsive means associated with said restrictor and connected with the advancing side of the motor operable for varying the restrictor inversely to the pressure on said advancing side of the motor, means responsive to a predetermined maximum pressure on said advancing side for simultaneously connecting said advancing side with exhaust and interrupting the supply of fluid from said first pump and interrupting said bypass whereby said second pump delivers directly to said retracting means and retraction of the boring slide and boring tool will take place.

3. In a boring machine; a frame, means for supporting and rotating the workpiece on the frame, a boring slide slidable on the frame adapted for supporting a boring tool for boring the workpiece, a fluid motor connected between the frame and the boring slide having advancing means for advancing the boring slide and retracting means for retracting the boring slide, a first pump for supplying said advancing means, a second pump connected to said retracting means, a bypass to exhaust from said second pump including a variable restrictor, fluid pressure responsive means associated with said restrictor and connected to said first pump for varying the degree of restriction of the restrictor inversely to the pressure developed by the first pump, a control valve between the first pump and said advancing means shiftable to interrupt the connection of the first pump to said advancing means and instead to connect the advancing means with exhaust, fluid operable means for so shifting said control valve, a reversing valve connected between the second pump and said fluid operable means, and means responsive to a predetermined pressure developed by said first pump greater than the normal operating pressure for actuating said reversing valve thereby to connect said advancing means with exhaust while simultaneously reducing the pressure to said fluid pressure responsive means whereby said bypass closes and the boring slide commences to retract.

References Cited in the file of this patent
UNITED STATES PATENTS

| | | |
|---|---|---|
| 772,706 | Driver et al. | Oct. 18, 1904 |
| 1,382,433 | McCarty | June 21, 1921 |
| 1,398,338 | Mirrielees | Nov. 29, 1921 |
| 1,513,350 | Stolle | Oct. 28, 1924 |
| 1,911,138 | Clute et al. | May 23, 1933 |
| 1,920,209 | Norton | Aug. 1, 1933 |
| 1,946,902 | Ferris | Feb. 13, 1934 |
| 1,975,250 | Calpha et al. | Oct. 2, 1934 |
| 1,986,862 | Svenson | Jan. 8, 1935 |
| 2,000,553 | Alden | May 7, 1935 |
| 2,042,379 | Barnes et al. | May 26, 1936 |
| 2,084,022 | Frank | June 15, 1937 |
| 2,146,446 | Schmidt et al. | Feb. 7, 1939 |
| 2,160,476 | Kampmeier | May 30, 1939 |
| 2,181,055 | Hirvonen | Nov. 21, 1939 |
| 2,240,795 | Morgan et al. | May 6, 1941 |
| 2,285,069 | Vickers | June 2, 1942 |
| 2,286,074 | Egger et al. | June 9, 1942 |
| 2,324,727 | Shartle | July 20, 1943 |
| 2,335,809 | Stacy | Nov. 30, 1943 |
| 2,552,463 | Searles | May 8, 1951 |

FOREIGN PATENTS

| | | |
|---|---|---|
| 535,575 | France | Jan. 26, 1922 |